United States Patent Office 2,817,679
Patented Dec. 24, 1957

2,817,679

PRODUCTION OF BASIC ALKALINE EARTH METAL PETROLEUM SULFONATES

Guy M. Verley, Harvey, Ill., assignor to Sinclair Refining Company, New York, N. Y., a corporation of Maine No Drawing. Application August 8, 1955
Serial No. 527,136

5 Claims. (Cl. 260—504)

This invention relates to the preparation of petroleum sulfonates. More specifically, this invention relates to an improved process for the preparation of oil-soluble sulfonates from petroleum fractions.

Mahogany or oil-soluble petroleum sulfonates are an established article of commerce finding extensive use, for example, as additives for various petroleum products such as lubricating oils, diesel oils, fuel oils, and similar materials. Alkali and alkaline earth metal sulfonates are the most common forms employed, especially basic alkaline earth metal sulfonates. The basic alkaline earth metal sulfonates have an alkaline reaction and are characterized by a higher metal content than neutral or normal sulfonates.

Conventionally petroleum sulfonates are produced by sulfonating a suitable aromatic petroleum fraction with a sulfonating agent such as fuming sulfuric acid or sulfur trioxide, separating the resulting sludge from the sulfonic acids contained in the oil phase and reacting the acids with the desired metal, usually in the form of an oxide or hydroxide, particularly a hydrated metal oxide, to obtain the desired product. The sludge phase which is produced during the sulfonation contains a quantity of oil and the so-called "green acids" in addition to tarry matter, polymerization products and other materials. These components of the sludge constitute a loss in-so-far as the production of the oil-soluble mahogany sulfonic acids and sulfonates is concerned, and in the interests of economical production of the desired products losses to sludge should be minimized.

In addition to the clearly oil-soluble and oil-insoluble products produced in a sulfonation process, borderline reaction products also are obtained. That is, a percentage of the sulfonic acids (or sulfonates) are more oil-soluble than water-soluble, still not sufficiently oil-soluble to permit their use without the necessity of conjointly employing a solubilizing medium. Other important considerations in the sulfonation art include the product color and the metal content of the product. As a generality it can be stated that lighter colors, more basic products and higher metal contents constitute the desideratum for most sulfonates produced for commercial application, especially those in the petroleum arts.

I have discovered an improved sulfonation process which is characterized by improved yields and lower sludge losses and produces petroleum sulfonates which have improved color and higher metal content. The improved process is effected by treating a sulfonation feed stock with hydrogen under hydrogenating conditions, sulfonating the resulting product and then reacting the sulfonic acids with the desired metal to produce normal salts, basic salts, salts intermediate the normal and basic salts or mixtures of normal and basic salts.

In accordance with my invention, feed stock is partially hydrogenated by contacting the feed material with hydrogen until an average of about 0.5 to 6 moles of hydrogen, and preferably about 2 to 4 moles, combine per mole of polynuclear aromatic. Advantageously, the hydrogenation is effected by heating the feed stock for about 0.5 to 20 hours at a temperature of about 350 to 900° F. under a superatmospheric pressure of hydrogen, i. e., about 50 to 3000 p. s. i. and especially about 500 to 1500 p. s. i. I prefer to hydrogenate in the presence of a catalyst; hydrogenation metal catalysts are well-known and include such metals as cobalt, iron, molybdenum, nickel, platinum, palladium, rhodium and combinations of the foregoing advantageously disposed on a suitable support, e. g., alumina. Particularly satisfactory catalysts include cobalt-molybdenum-on-alumina and platinum-on-alumina. About .1 to 25 weight percent of catalyst, based on the feed stock, generally is employed though the optimum amount used is, of course, dependent upon the particular catalyst and conditions used.

The hydrogenated stock can be sulfonated for purposes of the present invention according to any method. For example, oleum or sulfur trioxide can be used as the sulfonating agent; temperatures of about 30 to 200° F. normally are employed as are pressures of about atmospheric to 100 p. s. i. or more. If desired suitable diluents or cooling means can be used to aid in temperature control as the reaction is quite exothermic. It also is advantageous to dilute the sulfonating agent, especially if it is gaseous, with a carrier such as air or sulfur dioxide.

After sulfonation, sludge produced is removed after settling, and the sulfonic acids which are dissolved in the oil layer are reacted with the desired metal, for example, an alkali metal or alkaline earth metal and preferably barium or calcium; usually about 80 to 300 percent excess of the metal is employed when insuring a basic product. This reaction is conducted at an elevated temperature of about 125° F. to 500° F., the particular temperature chosen depending, of course, on the metal employed. Atmospheric or elevated pressures up to about 500 p. s. i. or more can be employed. The metal is usually employed as a water slurry of its oxide, hydroxide, or carbonate; hydrated hydroxides, such as barium hydroxide monohydrate, are preferred.

Materials which are employed as feed stock in my invention are straight-run distillate petroleum stocks boiling in the range of gas oils and lube oils. These materials have boiling ranges within about 600 to 1400° F. at atmospheric pressure. Particular feed stocks include lubricating oil fractions and gas oils and they can be obtained from Mid-Continent, naphthenic and paraffin base crudes; the feed materials can be refined, if desired, for example as by dewaxing and other conventional treatments. Extracts obtained by treating the foregoing feed stocks with a solvent such as phenol, furfural, or sulfur dioxide can also be used as feed stocks.

Dewaxed gas oils obtained from mixed-base crude oil such as East Texas and West Texas crudes are preferred. The gas oil feed stock usually is characterized by an average molecular weight of about 350 to 500, a boiling range such that 90% distills at about 750 to 1100° F. at atmospheric pressure, and an aromatics content of about 30 to 70 weight percent as indicated by silica gel adsorption; by aromatics I intend to indicate all cyclic compounds which are subject to hydrogen addition in the ring rather than only benzene-ring containing compounds.

The invention will be described further in conjunction with the examples which follow. It should be understood that the details disclosed are not to be considered as limiting the invention.

EXAMPLE I 49 grams of a cobalt-molybdenum-on-alumina catalyst was activated in the autoclave by heating 1 hour at 550° F. under 1000 p. s. i. hydrogen pressure, before 500 g.

of sweet West Texas dewaxed gas oil was added. Partial hydrogenation was accomplished at 650 to 675° F., 1000 to 1500 p. s. i. hydrogen, for 6 hours, after which hydrogen takeup decreased sharply. The autoclave was depressurized every two hours to remove the hydrogen sulfide and ammonia formed and was repressurized with hydrogen each time. A total of 21 liters of hydrogen had reacted. The hydrogenated material was filtered to yield 94% by weight of charge of light colored material. Results of hydrogenation are compared in the following table.

Table I

|  | Before Hydrogenation | After Hydrogenation |
| --- | --- | --- |
| Hydrogen Absorbed |  | 21 Liters/500 g. |
| Gravity, °API | 26.1 | 28.6. |
| KV/100° F | 217 | 164.3. |
| KV/210° F | 46 | 44.21. |
| Viscosity Index | 76 | 99. |
| NPA Color | 7— | Ca 1—. |
| Specific Dispersion | 143.8 | 122.7. |
| Refractive Index | 1.4990 | 1.4893. |
| Sulfur, percent | 0.56 | 0.05. |
| Nitrogen, percent | 0.06 | Not detectable. |
| 90% Distillation Range at 0.01 mm. °C | 144–242 | 123–240. |
| Average Molecular Weight | 418 | 412. |
| Total Aromatics (Silica Gel) | 46.4 | 44.3. |

The hydrogenated stock (150 g.) was diluted with acid treated kerosine (450 g). Oleum of 105% strength (60 g. or 40 weight percent of charge) was added gradually in 30 minutes with good stirring while the temperature increased from 76° F. to 96° F. After 2 hours settling, the sludge was decanted, diluted 3 to 1 with ice-water, extracted twice with butanol and the solvent topped from the extract at reduced pressure to yield 13 g. of sulfuric acid-free sludge. The mahogany acid-kerosine solution was air blown free of sulfur dioxide and settled 24 hours to yield 1 g. of additional sludge and 585 g. of clear, light colored, acid oil solution of 2.83 acid number. About 10 g. barium oxide and 3 g. of water were added, with stirring, to the 585 g. of mahogany acid-kerosine solution and the mass was heated to 300° F. to remove the water, topped at reduced pressure to remove the kerosine solvent and filtered to obtain 145 g. of barium mahogany sulfonate concentrate.

For comparative purposes, an equal amount of the non-hydrogenated stock was sulfonated and the barium salt made under conditions essentially identical to those employed for the hydrogenated stock. The barium sulfonates obtained in each instance were analyzed; the significant data obtained are:

Table II

|  | With Hydrogenation | Without Hydrogenation |
| --- | --- | --- |
| Sludge produced, grams | 14 | 46 |
| Yield, gms. mahogany barium sulfonate | 145 | 118 |
| Effective yield of Sulfonate [1] | 2.88 | 1.57 |
| Percent Barium (by sulfate ash) | 2.92 | 1.97 |
| O. D. Color per 1% Barium | 4 | 47 |
| Base No. to pH 4 | 12.32 | 8.05 |

[1] Ratio of final product to charge multiplied by percent barium.

These data show that in this specific case the process constituting my invention, when compared with an identical process except for the partial hydrogenation step, decreased sludge production by 70%, increased effective yield 83%, and decreased the color by 90%.

EXAMPLE II

A run was conducted according to the procedure of Example I with sulfur trioxide being employed as the sulfonating agent in place of oleum. A control run on an unhydrogenated stock was included. The data obtained are:

Table III

|  | With Hydrogenation | Without Hydrogenation |
| --- | --- | --- |
| Sludge Produced, grams | 43 | 102 |
| Yield, gms. mahogany barium sulfonate | 186 | 154 |
| Effective Yield of Sulfonate [1] | 9.78 | 5.8 |
| Percent Barium (by sulfate ash) | 9.05 | 6.52 |
| O. D. Color per 1% Barium | 11 | 97 |
| Base No. to pH 4 | 45.9 | 17.2 |

[1] Ratio of final product to charge multiplied by percent barium.

From the data of Table II it is apparent that the process of the present invention effected an improvement, as compared with a similar process with the exception that the feed material was not partially hydrogenated, in decreasing the sludge yield by 58%, increased the effective yield of mahogany barium sulfonate 69% and decreased the color of the product 89%.

The present invention was practiced on a phenol extract of a lubricating oil which upon sulfonation and neutralization without using the partial hydrogenation step, resulted in practically no yield due to the production of essentially 100 percent sludge in the sulfonation step. By partially hydrogenating (23 liters of hydrogen combined per 500 grams of extract) in accordance with the invention, a sulfonate having a base number to pH 4 of 10.7, a barium content of 3.46% and an effective yield of 1.98 was obtained.

I claim:
1. The improved method of producing oil-soluble petroleum sulfonates which comprises contacting a straight run petroleum distillate with hydrogen under hydrogenation conditions until about 0.5 to 6 moles of hydrogen are combined per mole of polynuclear aromatics present, sulfonating the resulting partially hydrogenated distillate to produce an oil-soluble sulfonic acid phase and contacting the sulfonic acid with an alkaline earth metal compound whereby a basic oil-soluble petroleum sulfonate is obtained.

2. The method of claim 1 wherein about 2 to 4 moles of hydrogen are combined per mole of aromatics present.

3. The method of claim 2 wherein said petroleum distillate is gas oil.

4. The method of claim 1 wherein the alkaline earth metal is barium.

5. The improved method of producing oil-soluble petroleum sulfonates which comprises contacting a straight run petroleum distillate gas oil, characterized by an average molecular weight of about 350 to 500, a boiling range such that 90% distills at about 750 to 1100° F. at atmospheric pressure and an aromatics content of about 30 to 70 weight percent as indicated by silica gel adsorption, with hydrogen under hydrogenation conditions until about 0.5 to 6 moles of hydrogen are combined per mole of polynuclear aromatics present, sulfonating the resulting partially hydrogenated distillate to produce an oil-soluble sulfonic acid phase and contacting the sulfonic acid with a barium compound whereby a basic oil-soluble petroleum sulfonate is obtained.

References Cited in the file of this patent
UNITED STATES PATENTS

| 2,108,901 | Pier et al. | Feb. 22, 1938 |
| 2,451,549 | Gzemski | Oct. 19, 1948 |
| 2,467,118 | Duncan et al. | Apr. 12, 1949 |
| 2,717,265 | Johnson | Sept. 6, 1955 |